United States Patent
Bhatt et al.

(10) Patent No.: US 12,198,187 B2
(45) Date of Patent: Jan. 14, 2025

(54) ARTIFICIAL INTELLIGENCE BASED METHODS AND SYSTEMS FOR PREDICTING MERCHANT LEVEL HEALTH INTELLIGENCE

(71) Applicant: MASTERCARD INTERNATIONAL INCORPORATED, Purchase, NY (US)

(72) Inventors: Deepak Bhatt, Dehradun (IN); Tanmoy Bhowmik, Bangalore (IN); Deepak Yadav, Allahabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 77 days.

(21) Appl. No.: 17/696,497

(22) Filed: Mar. 16, 2022

(65) Prior Publication Data
US 2022/0301049 A1 Sep. 22, 2022

(30) Foreign Application Priority Data
Mar. 17, 2021 (IN) .............................. 202141011317

(51) Int. Cl.
*G06Q 40/03* (2023.01)
*G06N 3/045* (2023.01)
(Continued)

(52) U.S. Cl.
CPC .............. *G06Q 40/03* (2023.01); *G06N 3/045* (2023.01); *G06N 3/08* (2013.01)

(58) Field of Classification Search
CPC .......... G06Q 40/03; G06N 3/045; G06N 3/08; G06N 3/0442; G06N 3/084; G06N 3/0455;
(Continued)

(56) References Cited

U.S. PATENT DOCUMENTS 7,165,037 B2   1/2007 Lazarus et al.
7,376,618 B1 *  5/2008 Anderson .............. G06Q 40/12
                                                   705/38
(Continued)

OTHER PUBLICATIONS

Nishant Agarwal et al., "Fraud Risk Prediction in Merchant-Bank Relationship using Regression Modeling", Vikalpa, Jul. 1, 2014, pp. 67-76, vol. 39 issue 3.

(Continued)

*Primary Examiner* — Clifford B Madamba
(74) *Attorney, Agent, or Firm* — Jordan IP Law, LLC

(57) ABSTRACT

Embodiments provide methods and systems for predicting merchant level health intelligence. Method performed by server system includes accessing, from a transaction database, payment transaction data of a merchant for a period of time. The payment transaction data includes information of payment transactions between a plurality of cardholders and the merchant for the period of time. The method includes aggregating merchant transaction attributes based, at least in part, on the payment transaction data and calculating a merchant membership vector based, at least in part, on the merchant transaction attributes by applying a soft-clustering model over the merchant transaction attributes. The method further includes predicting a commercial credit score and a merchant delinquency rate associated with the merchant based, at least in part, on the merchant membership vector. The commercial credit score and the merchant delinquency rate are predicted based, at least in part, on a multi-task learning model.

20 Claims, 10 Drawing Sheets

(51) Int. Cl.
*G06N 3/08* (2023.01)
*G06N 20/00* (2019.01)

(58) Field of Classification Search
CPC ..... G06N 3/09; G06N 3/096; G06N 7/01; G06N 20/00
USPC .......................................................... 705/38
See application file for complete search history.

(56) References Cited

U.S. PATENT DOCUMENTS

| | | |
|---|---|---|
| 8,032,448 B2 | 10/2011 | Anderson et al. |
| 2006/0015377 A1* | 1/2006 | Hoogs .................... G06Q 30/02 705/7.11 |
| 2007/0026099 A1* | 2/2007 | Hagiwara ............. B29C 64/153 425/174.4 |
| 2007/0226099 A1* | 9/2007 | Senturk-Doganaksoy .................. G06F 17/18 705/35 |
| 2009/0307049 A1* | 12/2009 | Elliott, Jr. .............. G06Q 40/00 705/7.29 |
| 2011/0251945 A1 | 10/2011 | Liao et al. |
| 2015/0269669 A1 | 9/2015 | Gil et al. |
| 2019/0311428 A1 | 10/2019 | Adjaoute |

OTHER PUBLICATIONS

Asma Marouani, "Predicting Default Probability Using Delinquency: The Case of French Small Businesses", Feb. 15, 2014, 32 pgs, https://bit.ly/30X5VXC.
Rogelio A. Mancisidor et al., "Learning Latent Representations of Bank Customers With The Variational Autoencoder", Mar. 14, 2019, pp. 1-17, https://arxiv.org/abs/1903.06580v1.

* cited by examiner

ARTIFICIAL INTELLIGENCE BASED METHODS AND SYSTEMS FOR PREDICTING MERCHANT LEVEL HEALTH INTELLIGENCE

CROSS-REFERENCE TO RELATED APPLICATIONS

This application claims the benefit of, and priority to India patent application No. 202141011317 filed on Mar. 17, 2021. The entire disclosure of the above-referenced application is incorporated herein by reference.

TECHNICAL FIELD

The present disclosure relates to artificial intelligence processing systems and, more particularly to, electronic methods and complex processing systems for predicting merchant level health intelligence proactively using machine learning techniques.

BACKGROUND

Majority of business institutions (also referred as 'merchants') rely on banks for variety of services that make it easier to do business and grow the business institutions. One such service is loan. By providing loans to merchants, the banks make money from the interest they get on the loan. However, the banks sometimes have to bear losses when the merchants go bankrupt or delinquent. Therefore, assessing merchant level risk to determine if the merchants will get delinquent becomes critical for banks.

The banks, in many such cases, fetch information from a commercial bureau database (e.g., dun & Bradstreet bureau). However, the information from the commercial bureau is mostly reactive indicating that merchant is already at the verge of becoming delinquent. This leaves no room for banks to reduce credit limits of already existing customer merchants or to stop the transactions. Further, one of the reasons of merchant delinquency may be the customers with high risk profiles visiting the merchant store and performing payments. The existing systems or the banks do not take this factor into consideration.

Therefore, there is a requirement of a system or a method to predict the merchant level health intelligence beforehand. More particularly, there is a technological need for a technical solution to predict whether a merchant will become delinquent, much before the merchant actually gets delinquent.

SUMMARY

Various embodiments of the present disclosure provide systems, methods and electronic devices for predicting merchant level health intelligence proactively using machine learning techniques.

In an embodiment, a server system is disclosed. The server system includes a communication interface, a memory including executable instructions, and a processor communicably coupled to the communication interface and the memory. The processor is configured to execute the executable instructions to cause the server system to access, from a transaction database, payment transaction data of a merchant for a period of time. The payment transaction data includes information of payment transactions between a plurality of cardholders and the merchant for the period of time. The server system is further caused to aggregate merchant transaction attributes based, at least in part, on the payment transaction data and to calculate a merchant membership vector based, at least in part, on the merchant transaction attributes by applying a soft-clustering model over the merchant transaction attributes. Further, the server system is caused to predict a commercial credit score and a merchant delinquency rate associated with the merchant based, at least in part, on the merchant membership vector. The commercial credit score and the merchant delinquency rate are predicted based, at least in part, on a multi-task learning model.

In another embodiment, a computer-implemented method is disclosed. The computer-implemented method includes accessing, by a server system from a transaction database, payment transaction data of a merchant for a period of time. The payment transaction data includes information of payment transactions between a plurality of cardholders and the merchant for the period of time. The computer-implemented method further includes aggregating, by the server system, merchant transaction attributes based, at least in part, on the payment transaction data and calculating, by the server system, a merchant membership vector based, at least in part, on the merchant transaction attributes by applying a soft-clustering model over the merchant transaction attributes. Further, computer-implemented method includes predicting, by the server system, a commercial credit score and a merchant delinquency rate associated with the merchant based, at least in part, on the merchant membership vector. The commercial credit score and the merchant delinquency rate are predicted based, at least in part, on a multi-task learning model.

BRIEF DESCRIPTION OF THE FIGURES

For a more complete understanding of example embodiments of the present technology, reference is now made to the following descriptions taken in connection with the accompanying drawings in which.

Figure 1:
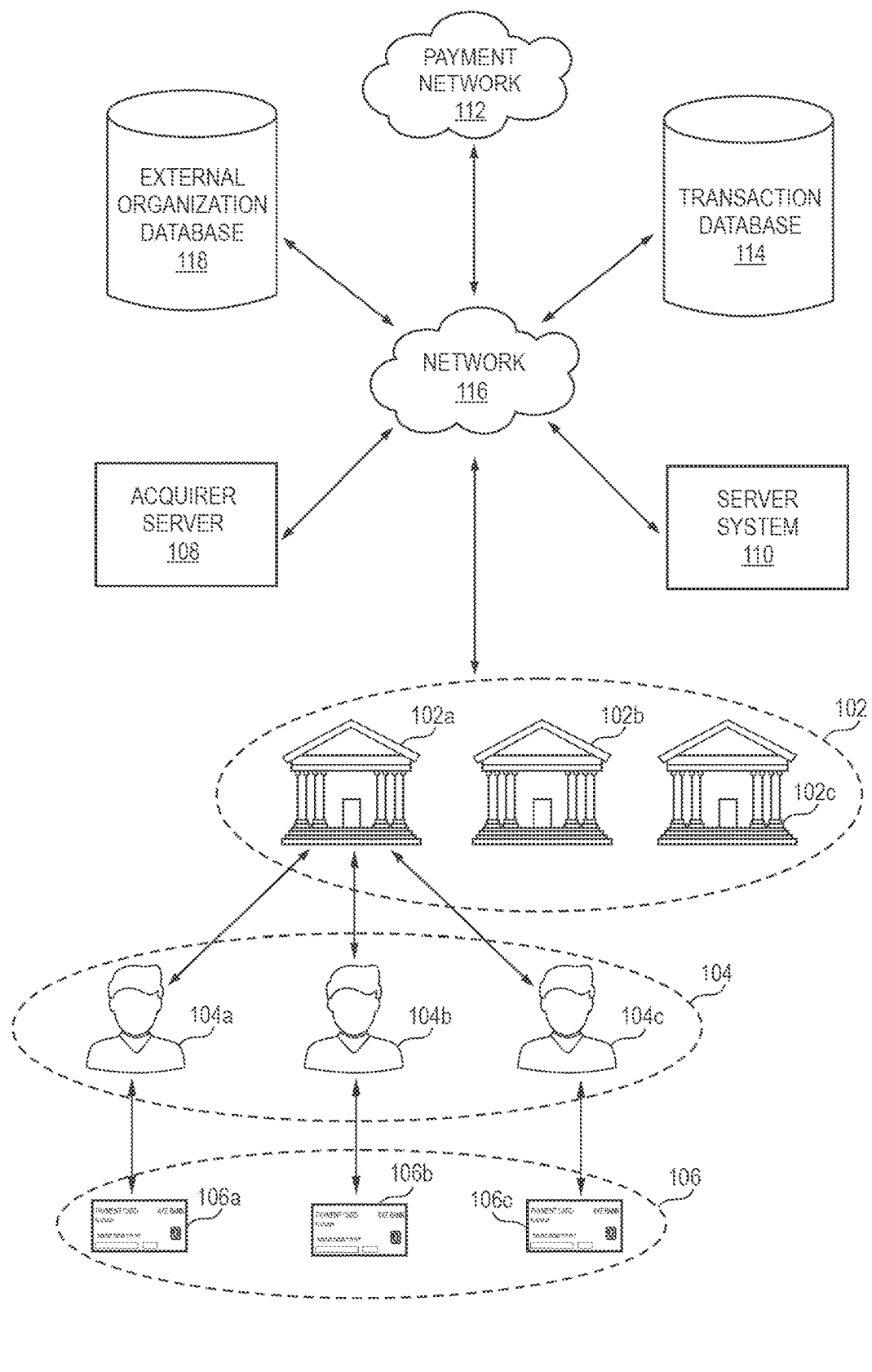
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" or "financial account" used throughout the description refers to a financial account that is used to fund a financial transaction. Examples of the financial account include, but are not limited to, a savings account, a credit account, a checking account, and a virtual payment account. The financial account may be associated with an entity such as an individual person, a family, a commercial entity, a company, a corporation, a governmental entity, a non-profit organization, and the like. In some scenarios, a financial account may be a virtual or temporary payment account that can be mapped or linked to a primary financial account, such as those accounts managed by payment wallet service providers, and the like.

The term "payment network", used herein, refers to a network or collection of systems used for the transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes that may include payment cards, letters of credit, checks, financial accounts, etc. Examples of networks or systems configured to perform as payment networks include those operated by such as, Mastercard©.

The term "merchant", used throughout the description generally refers to a seller, a retailer, a purchase location, an organization, or any other entity that is in the business of selling goods or providing services, and it can refer to either a single business location, or a chain of business locations of the same entity.

The terms "cardholder", "card member", and "customer" are used interchangeably throughout the description, and refer to a person who holds a credit or a debit card that will be used by a merchant to perform a payment transaction.

The terms "delinquent," "delinquency," and the like are used throughout the description, in their economic sense and refer to failure in or neglect of duty or obligation; dereliction; something, as a past debt. For example, the term "merchant delinquency rate" is a number which may be represented as a percentage to show a probability that the merchant will become delinquent in future.

The term "merchant health", "merchant level health", or "merchant health intelligence" relates to financial status or financial health of the merchant. A merchant having a bad merchant health would indicate that the merchant is not doing well financially in his business, or in some cases may be on the verge of becoming bankrupt or delinquent.

Overview

Various example embodiments of the present disclosure provide methods, systems, user devices and computer program products for predicting merchant level health intelligence proactively at a desired frequency for merchant risk profiling using machine learning techniques. In most scenarios, assessing merchant level risk becomes critical for banks. The merchant level risk may be gauged by predicting a merchant delinquency rate and a commercial credit score.

In an example, the present disclosure describes a server system that is configured to access payment transaction data of a merchant from a plurality of merchants for a period of time. The server system is configured to access the payment transaction data from a transaction database associated with the merchant. The payment transaction data includes information of payment transactions between a plurality of cardholders and the merchant for the period of time. The server system is configured to pre-process the payment transaction data to extract merchant transaction attributes. In one embodiment, the merchant transaction attributes include time-series sales data associated with the merchant, customer risk profiles of the plurality of cardholders who performed payments at a store of the merchant during the period of time, and card product types associated with the plurality of cardholders.

The server system is configured to aggregate the merchant transaction attributes based on the payment transaction data. The merchant transaction attributes of the merchant are aggregated on the timely basis based on a tunable parameter. The tunable parameter indicates a frequency level of the aggregation of the merchant transaction attributes. The server system is configured to calculate a merchant membership vector by applying a soft-clustering model over the merchant transaction attributes. The merchant membership vector is indicative of probabilities that the merchant is associated with each cluster of a plurality of clusters. The dimension of the merchant membership vector is equal to the number of plurality of clusters.

To generate the plurality of clusters, the server system is configured to access historical payment transaction data associated with a plurality of merchants from the transaction database of a particular time duration and aggregate merchant transaction attributes of each merchant of the plurality of merchants on a timely basis to generate a multivariate time-sequence merchant data for each merchant. The server system is configured to create the plurality of clusters based, at least in part, on the multivariate time-sequence merchant data by applying the soft-clustering model. Thereafter, the server system is configured to determine cluster profiles for the plurality of clusters based, at least in part, on available merchant bureau information of the plurality of merchants and customer risk profiles associated with cardholders performing payments at the plurality of merchants, on a periodic basis.

In one embodiment, cluster profile variables associated with the merchant are determined based, at least in part, on distances of the merchant from centroids of the plurality of clusters and the cluster profiles of the plurality of clusters.

Subsequent to calculating the merchant membership vector and the cluster profile variables, the server system is configured to predict a commercial credit score and a merchant delinquency rate by applying a multi-task learning model. The multi-task learning model includes neural network models including a global neural network model, a first task-specific neural network model, and a second task-specific neural network model. In the training phase, the multi-task learning model is trained based on merchant membership vectors associated with the plurality of merchants and the cluster profiles associated with the plurality of clusters.

The server system is configured to feed the merchant membership vector and cluster profile variables associated with the merchant to the global neural network model to generate an output and determine the commercial credit score associated with the merchant using the first-task specific neural network model based on the output of the global neural network model. Further, the server system is configured to determine the merchant delinquency rate associated with the merchant based on the output of the global neural network model using the second-task specific neural network model.

In an embodiment, during the training phase, the multi-task learning model is trained by assigning global weights of a global neural network based on cluster profile variables and merchant membership vectors of the plurality of merchants. Specific tasks such as calculating delinquency rate and commercial credit scores are assigned to task-specific neural network models. The local weights of these task specific neural network models are fine-tuned. The validation errors occurred in all the task-specific neural network models are combined and provided to the global neural network model. This process is repeated in the training process until accuracy prediction of the multi-task learning model reaches to a threshold value.

Various embodiments of the present disclosure offer multiple advantages and technical effects. For instance, the present disclosure provides a system for predicting merchant level health intelligence using machine learning techniques which helps the acquirers or any third-party who give loans to the merchant to assess merchants and take precautionary measures (such as reducing credit limit for the merchants who have a high possibility to become delinquent) beforehand. In addition, the methods and systems help in predicting merchant delinquency rate and commercial credit score of a merchant for any period of time. The present disclosure helps to predict merchant level health of those merchants as well who have started the business recently or merchants unknown to the systems. Further, the soft clustering model takes into account all those merchants who can be in multiple clusters because of time-variant purchase behavior, thereby making the method more inclusive.

The present disclosure provides significantly more robust solutions because of handling simultaneous/concurrent processor execution (such as applying one or more task-specific neural network models, simultaneously). The multi-task learning approach enables to perform various tasks using the same data representations and quickly adapt to various tasks using only a few data points and training iterations.

Various example embodiments of the present disclosure are described hereinafter with reference to FIGS. 1 to 10.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, predicting a merchant delinquency rate and a commercial credit score of a merchant. The environment 100 generally includes a plurality of entities, for example, a plurality of merchants 102a, 102b, and 102c and an acquirer server 108, a payment network 112, and a transaction database 114 each coupled to, and in communication with (and/or with access to) a network 116. The network 116 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 116 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), $5^{th}$ Generation (5G) communication protocols, Long Term Evolution (LTE) communication protocols, or any combination thereof. For example, the network 116 may include multiple different networks, such as a private network made accessible by the payment network 112 to the acquirer server 108, separately, and a public network (e.g., the Internet etc.).

The environment 100 also includes a server system 110 configured to perform one or more of the operations described herein. In one example, the server system 110 is embodied in the payment network 112. In general, the server system 110 is configured to predict or determine whether a merchant will become delinquent in future. In addition, the server system 110 is configured to predict delinquency rate and a commercial credit score for each merchant. The server system 110 is a separate part of the environment 100, and may operate apart from (but still in communication with, for example, via the network 116) the acquirer server 108, the payment server, and any third party external servers (to access data to perform the various operations described herein). However, in other embodiments, the server system 110 may actually be incorporated, in whole or in part, into one or more parts of the environment 100, for example, the acquirer server 108. In addition, the server system 110 should be understood to be embodied in at least one computing device in communication with the network 116 that may be specifically configured, via executable instructions, to perform steps as described herein, and/or embodied in at least one non-transitory computer-readable media.

In one embodiment, a plurality of merchants 102a, 102b, and 102c is associated with the acquirer server 108. The plurality of merchants 102a, 102b, and 102c hereinafter is collectively represented as "merchant 102".

The merchant 102 may have a plurality of customers that may use payment cards to perform transactions at the merchant store. For example, as shown in FIG. 1, a plurality of cardholders 104a, 104b, and 104c are the customers associated with the merchant 102a. Further, the plurality of cardholders 104a, 104b, and 104c may possess payment cards 106a, 106b, and 106c, respectively. The payment cards 106a, 106b, and 106c hereinafter are collectively represented as "payment card 106". Further, the plurality of cardholders 104a, 104b, and 104c is hereinafter collectively represented as "cardholder 104". The cardholder 104 may be any individual, representative of a corporate entity, non-profit organization, or any other person.

To accept payment transactions from the customers, the merchant 102 normally establishes an account with a financial institution (i.e., "acquirer server 108") that is part of the financial payment system. Account details of the merchant accounts established with the acquirer bank are stored in merchant profiles of the merchants in a memory of the acquirer server 108 or on a cloud server associated with the acquirer server 108. It shall be noted that all the merchants 102a-102c may not be associated with a single acquirer and the merchants may establish financial accounts with different acquirers and thereby payment transactions may be facilitated by more than one acquirer server and have not been explained herein for the sake of brevity.

In one embodiment, the acquirer server 108 is associated with a financial institution (e.g., a bank) that processes financial transactions. This can be an institution that facilitates the processing of payment transactions for physical stores, merchants, or an institution that owns platforms that make online payments or payments made via software applications possible (e.g., shopping cart platform providers and in-app payment processing providers). The terms "acquirer", "acquirer bank", "acquiring bank" or "acquirer server" will be used interchangeably herein.

In one embodiment, the acquirer server 108 may provide commercial credit cards or business credit cards to the merchant 102 with high credit limits. The acquirer server 108 may also provide loans to the merchant 102 time to time. Therefore, the acquirer 108 always wants to know merchant health status on a frequent basis. In other words, the acquirer 108 is willing to assess commercial credit score and/or merchant delinquency predictions of the merchant 102. However, such information like commercial credit scores associated with the merchants is generally not available at hand at any time with high accuracy.

For predicting a possibility of a merchant becoming delinquent depends mainly on two factors. Firstly, merchant delinquency depends on the payment transactions carried at the merchant store by various customers. In order to predict the merchant delinquency rates of merchants in the future, the server system 110 may be configured to fetch payment transaction data associated with a plurality of merchants 102a-102c from one or more databases (e.g., transaction database 114) associated with the acquirer server 108.

Secondly, the merchant delinquency depends on customer risk profile of cardholders or customers making transactions at the merchant. There is a high chance that the merchant may head towards delinquency in case a substantial number of cardholders making transactions at the merchant stores has high risk scores or is defaulters. Therefore, the cardholders making payments on the merchant stores may also contribute in the delinquency of the merchant. The risk profiles of the cardholders may be fetched from external sources such as an external organization database 118 shown in FIG. 1. An example of the external organization database 118 may be, but is not limited to, a credit bureau database.

In one embodiment, the server system 110 is configured to perform unsupervised clustering to cluster purchase behavior across merchants. The server system 110 is configured to generate a purchase sequence associated with each merchant by aggregating merchant transaction attributes either on time basis or by customer risk profiles of customers who performed purchases at the merchant and generate soft clusters based on the purchase sequence of each merchant based on a soft-clustering model. In one embodiment, the server system 110 is configured to predict commercial credit scores of unknown merchants or new merchants whose merchant bureau information is not available based at least on their association with the generated soft clusters.

In one embodiment, the payment network 112 may be used by the payment cards issuing authorities as a payment interchange network. The payment network 112 may include a plurality of payment servers. Examples of payment interchange network include, but are not limited to, Mastercard© payment system interchange network. The Mastercard© payment system interchange network is a proprietary communications standard promulgated by Mastercard International Incorporated© for the exchange of financial transactions among a plurality of financial activities that are members of Mastercard International Incorporated©. (Mastercard is a registered trademark of Mastercard International Incorporated located in Purchase, N.Y.).

In one embodiment, the transaction database 114 is a central repository of data associated with the acquirer 108 or the payment network 112 that is created by storing payment transaction data (i.e., purchase transaction data) associated with financial transactions between a plurality of merchants and their associated customers from financial transactions occurring within acquirers and issuers associated with the payment network 112. The payment transaction data associated with each merchant may include, but is not limited to, merchant transaction attributes, such as, a transaction identifiers, payment card type (debit/credit/prepaid), card product types, transaction amounts, transaction time information, etc.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
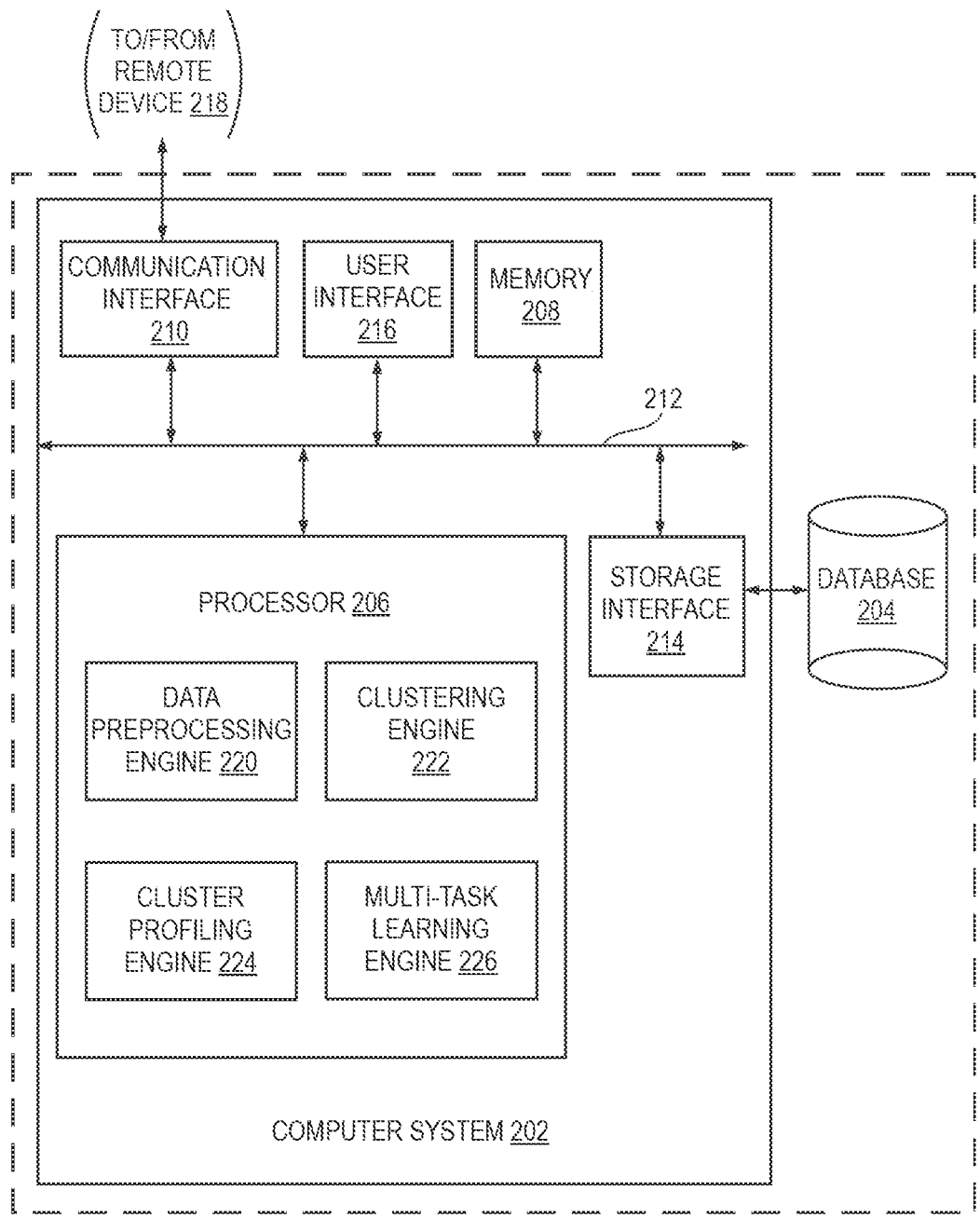
FIG. 2 is a simplified block diagram of a server system, in accordance with one embodiment of the present disclosure.

FIG. 2 is a simplified block diagram of a server system 200, in accordance with an embodiment of the present disclosure. The server system 200 is similar to the server system 110 as shown in FIG. 1. In some embodiments, the server system 200 is embodied as a cloud-based and/or SaaS-based (software as a service) architecture. In one embodiment, the server system 200 is a part of a payment network 112 or is integrated within a payment server. In another embodiment, the server system 200 is embodied within the acquirer server 108.

The server system 200 includes a computer system 202 and a database 204. The computer system 202 includes at least one processor 206 for executing instructions, a memory 208, a communication interface 210, and a user interface 216 that communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 200, without departing from the scope of the present disclosure.

The processor 206 is operatively coupled to the communication interface 210, such that the processor 206 is capable of communicating with a remote device 218 such as, the merchant 102, or communicated with any entity connected to the network 116 (as shown in FIG. 1). Further, the processor 206 is operatively coupled to the user interface 216 for predicting delinquency rates and commercial credit score of a merchant.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 220, a clustering engine 222, a cluster profiling engine 224, and a multi-task learning engine 226. It should be noted that the components, described herein, can be configured in a variety of ways, including electronic circuitries, digital arithmetic and logic blocks, and memory systems in combination with software, firmware, and embedded technologies.

The data pre-processing engine 220 includes suitable logic and/or interfaces for accessing historical payment transaction data of a plurality of merchants for a period of time (e.g., a week). The payment transaction data of the plurality of merchants is accessed from a transaction database 114. The payment transaction data for a merchant 102 may include information of payment transactions between a plurality of cardholders (e.g., cardholders 104a-104c) and the merchant for the period of time. In particular, the payment transaction data associated with each merchant 102 may include, but not limited to, cardholder identifiers, card product types, merchant identifier, spending amounts of payment transactions, time/date stamps associated with the payment transactions, etc.

The data pre-processing engine 220 is configured to extract merchant transaction attributes from the payment transaction data. In one embodiment, the data pre-processing engine 220 is configured to arrange or aggregate the merchant transaction attributes in a time-series manner to generate a multivariate time-sequence merchant data for each merchant. The merchant transaction attributes may include, but not limited to, time-series sales data during a period of time, customer risk profiles of the plurality of cardholders who visited to the merchant to purchase products during the period of time, card product types (such as, Platinum, Standard, Elite, etc.) associated with the plurality of cardholders, types of products purchased by the plurality of cardholders, etc. The frequency of aggregation may vary as hourly, daily, weekly, or monthly depending on a merchant category in which a particular merchant falls. For example, for a small merchant with less volume of purchase transactions, monthly merchant transaction attributes might be considered, while for a large merchant with more volume of payment transactions, hourly merchant transaction attributes might be considered. Therefore, the frequency with which the merchant transaction attributes are aggregated is considered as a tunable or configurable parameter which can be varied. This is advantageous because all types of merchants, small or big, can be included in the analysis. More illustratively, merchant transaction attributes of a particular merchant are aggregated on a timely basis based on the tunable parameter and the tunable parameter indicates a frequency level of aggregation for the merchant transaction attributes.

In particular, the data-preprocessing engine 220 is configured to represent the time-series sales data into a multivariate time-series data form based on aggregated sales amount and count of sales. For example, for a merchant A, suppose the aggregated sales in the months from January to June are $4500, $3000, $5000, $2600, $3400, $4000, and the counts of sales for those months are 150, 200, 370, 90, 125, and 145, respectively. Therefore, the time-series data of the merchant transaction attributes for the time period from January to June would be represented as (4500, 150), (3000, 200), (5000, 370), (2600, 90), (3400, 125), and (4000, 145). This form of representation signifies how good a business of the merchant performs.

In some embodiments, the data pre-processing engine 220 may be configured to add an additional dimensionality to represent a merchant 102. For example, the data pre-processing engine 220 is configured to perform normalized aggregation of customer risk profile (for example, FICO scores) of the plurality of cardholders making payments at the merchant 102. The data pre-processing engine 220 may be configured to receive the customer risk profiles of cardholders from external credit bureau databases such as the external organization database 118 shown in FIG. 1. The normalization may be performed with the plurality of cardholders making payments from the merchant in the time duration chosen for aggregation (e.g., January to June as explained in the above-mentioned example).

In some embodiments, the merchant transaction attributes are aggregated based on the customer risk profiles of the plurality of cardholders over the period of time.

In one example embodiment, the data pre-processing engine 220 is configured to calculate average count of different card product types used by the cardholders for the payment transactions at the merchant 102. For example, the payment cards might be premium card or standard or gift card and the like. The different card product types are allocated different numbers. Such as premium card may be represented as 5, standard card by 4 and gift card by 3 and so on. The average count of card product types may also be included as a merchant transaction attribute. The card product types help in understanding profile status of the plurality of cardholders.

Thus, the data pre-processing engine 220 is configured to preprocess payment transaction data and the data gathered from external databases or the transaction database 114 to represent a merchant using a combination of merchant transaction attributes such as sales volume, sales count and customer risk profiles of cardholders before they are passed for training the clustering engine 222.

In one non-limiting example, the data pre-processing engine 220 is configured to represent the merchant transaction attributes as a matrix as shown below:

$$M = \begin{bmatrix} 5010 & 23 & 7.8 & 34 \\ 4656 & 20 & 6.9 & 25 \\ 6789 & 35 & 9 & 20 \end{bmatrix}$$

In the above matrix M, the rows represents values of merchant transaction attributes on an hourly basis and columns 1, 2, 3, and 4 represent hourly aggregated sales, hourly aggregated count of sales, average risk profile of customers performed payments, and average count of product types. For example, let us say for a merchant A, 10 customers performed payments at a merchant store between 10 am and 11 am on a day. The hourly aggregated sales made by those customers is $5010, the total number of items (i.e., aggregated count sales) purchased by those customers is 23, the average risk profile of customers (i.e., total of risk profiles of customers divided by total number of customers purchasing from the merchant, in this case 10) is 7.8 and the average count of purchased product types is 34 (see row 1 of the Matrix M). Similarly, rows 2 and 3 in the matrix would represent aggregated sales, hourly aggregated count of sales, average risk profile of the customers performed payments, and count of purchased product types for the customers performing payments and count of purchase transactions between 11 am-12 pm and 12 pm-1 pm respectively. Similarly, the rows in the matrix will increase if more hours of data has to be analyzed.

It is to be noted that the aggregation frequency of the payment transaction data may be varied. In cases where the merchant has a big store or large number of customers performs payments at the store of the merchant, the transaction data may be analyzed on an hourly basis. In cases where the merchant is a small merchant entity, with less number of customers performing payment at the merchant store, daily, weekly, or monthly transaction data may be considered for deriving merchant attributes instead of hourly transaction data. In this case, each row of the matrix will represent daily, weekly, or monthly merchant attributes. This step ensures that all merchants, irrespective of their size of sales, can be accommodated while training the system or predicting the delinquency of merchants.

During the training phase, the data pre-processing engine 220 may be configured to receive historical payment transaction data of a plurality of merchants, whereas, during the prediction phase, the data pre-processing engine 220 may be configured to receive payment transaction data of a merchant or an unknown merchant whose data may or may not be used in training various machine learning engines (e.g., clustering engine 222 and multi-task learning engine 226) of the processor 206.

The clustering engine 222 includes suitable logic and/or interfaces for calculating a merchant membership vector based, at least in part, on the aggregated merchant transaction attributes of a merchant by applying a soft-clustering model over the merchant transaction attributes. The merchant membership vector is indicative of probabilities that the merchant 102 is associated with each cluster (i.e., cluster membership probabilities) of a plurality of clusters. In one embodiment, the soft-clustering model may implement based on a probabilistic mixture model. In one non-limiting example, the probabilistic mixture model is Gaussian mixture model (GMM). Additionally, the soft-clustering model may include similarity threshold(s) that guide how the soft-clustering model determines how similar the probability distributions should be before merchants are associated with a particular cluster (or multiple clusters), which is explained in more detail below.

Initially, during the training phase, the clustering engine 222 is configured to generate the plurality of clusters based on the aggregated merchant transaction attributes associated with the plurality of merchants. The historical payment transaction data associated with the plurality of merchants is accessed from the transaction database 114 for the particular time duration (for example, last one year).

Thus, the clustering engine 222 is configured to create the plurality of clusters based on the multivariate time-series sequence merchant data associated with each merchant from the plurality of merchants by applying the soft-clustering model.

More particularly, the clustering engine 222 is configured to cluster similar kind of merchants with similar merchant transaction attributes into one cluster. Each cluster includes one or more merchants with similar characteristics such as, type of purchase behavior. Therefore, the plurality of clusters is formed wherein each cluster has merchants possessing similar merchant transaction attributes. Merchants experiencing similar type of purchase behavior falls under one cluster. Further, high risk cardholders who tend to make purchase at a particular set of merchants fall under similar cluster. For example, a merchant with average transaction size of $40 within 2 hours belongs to a particular merchant cluster that has norm spending average of customers about $40.00 per transaction within 2 hours.

Thereafter, the clustering engine 222 is configured to evaluate cluster quality of the plurality of clusters by applying some standard matrices or by a human. In one example, when a particular merchant is not allocated to a cluster with similar purchase behavior of the merchant, the clustering engine 222 is configured to update or re-generate the plurality of clusters by changing some hyper-parameters. In other words, when the cluster quality does not satisfy preset conditions, the processor 206 is configured to tune this hypermeter and again the clustering process is performed.

In one embodiment, the tunable parameter associated with the frequency level of aggregation of the merchant transaction attributes of the merchant 102 may be configured or varied to improve the cluster quality. Thus, by changing the tunable parameter, an improved and enhanced merchant representation can be derived from the payment transaction data.

Once the plurality of clusters is formed, a dynamic merchant membership vector for each merchant is calculated. The dynamic merchant membership vector (also referred as merchant membership vector) is determined based on a distance of the data point values associated with the merchant (hereinafter referred to as merchant data point value) from a centroid of each of the clusters. Detailed explanation associated with clustering process is explained in detail with reference to FIGS. 3 and 4.

In general, clustering refers to grouping of similar type of data into one cluster. Soft clustering refers to the clustering process in which one or more clusters may overlap with each other. For example, a merchant may belong to two or more clusters at the same time. In some embodiments, it shall be noted that the clustering engine 222 may use soft-clustering algorithms such as, but not limited to, Gaussian Mixture Model (GMM) based clustering, Dirichlet Multinomial Mixture (DMM) based clustering, etc.

The cluster profiling engine 224 includes suitable logic and/or interfaces for profiling the characteristics of a cluster on the basis of bureau information of the merchants in the cluster and risk profiles of cardholders making payments at those merchants. In other words, the cluster profiling engine 224 is configured to determine cluster profiles for the plurality of clusters based, at least in part, on merchant bureau information of the plurality of merchants and customer risk profiles associated with cardholders performing payments at the stores of the plurality of merchants. The plurality of clusters is updated periodically using information from merchant bureau databases or external organization database 118. The merchant bureau information is used to derive cluster profile variables or attributes in terms of merchant bureau risk score. For example, for a cluster, a parameter representing the proportion of population falling under a particular risk category is used for determining the cluster profile for the cluster. Merchant transaction attributes of the clusters change after the merchant bureau information is updated.

More particularly, profiling of clusters relates to calculating an average of merchant commercial credit scores obtained from the credit bureau database and the risk profiles of the cardholders. The cluster profiling engine 224 may be configured to fetch the bureau information of merchants and the customer risk profile information of cardholders from external organization database 118.

For each cluster, two characteristics are determined on a periodic basis. Firstly, a weighted commercial credit score is assigned to each cluster. The weights are defined using the distance of each merchant to the cluster it belongs to. For example, if a merchant labelled M, lies in a cluster, then the weight is defined using the distance of merchant M represented in the cluster from a centroid of cluster. The centroid of a cluster is defined as a data point which is average of all the data points belonging to the cluster. Secondly, a weighted default rate is assigned to each cluster based on the bureau information of merchants and the risk profile information of cardholders.

During the prediction phase, the merchant membership vector is obtained using all the clusters for a given merchant. In order to identify cluster profile variables for a given merchant, the cluster profiling engine 224 is configured to determine which cluster is the closest to the given merchant (using standard distance metric such as distance to centroid of a cluster) and accordingly, the cluster profile of the closest cluster is chosen to determine cluster profile variables to be associated to the given merchant. The cluster profile variables for the merchant include the weighted commercial credit score and the weighted default rate of the closest cluster.

The multi-task learning engine 226 includes suitable logic and/or interfaces for predicting a commercial credit score and a merchant delinquency rate associated with the merchant 102 based, at least in part, on the merchant membership vector of the merchant 102 and a multi-task learning model. The multi-task learning model is trained based on the merchant membership vectors associated with the plurality of merchants and the cluster profiles associated with the plurality of clusters.

As mentioned previously, the merchant level health can be determined by identifying two factors (i.e., the commercial credit score and the merchant delinquency rate) that can be denoted as two different tasks. Since required data representation is almost the same for both the tasks with objectives being different, therefore, the multi-task learning model is utilized. The multi-task learning model may include neural network models including, but not limited to, a global neural network model, a first task-specific neural network model, and a second task-specific neural network model. The first task-specific neural network model is responsible for predicting the commercial risk score and the second task-specific neural network model is responsible for predicting the merchant delinquency rate of the merchant 102.

It shall be noted that the multi-task learning engine 226 may be a neural network based engine. The method associated with training the multi-task learning engine 226 is described in detail with reference to FIG. 8 below.

During the prediction phase, the global neural network model is provided with an input feature (including the merchant membership vector and the cluster profile variables associated the merchant 102) for generating a latent space representation as an output. The latent space representation is provided to the first and second task-specific neural network models for determining the commercial credit score and the merchant delinquency rate, respectively.

In one example, the multi-task learning model may be implemented based on a model agnostic meta-learning (MAML) model approach. The MAML model aims to learn the parameters of any standard model via meta-learning in such a way so as to prepare that model for fast adaptation. A neural network model might learn internal features that are broadly applicable to all tasks, rather than a single individual task. The MAML model is fine-tuned using a gradient-based learning rule on a new task. The MAML model aims at finding model parameters that are sensitive to changes in the task.

In another example, the multi-task learning model can be chosen as time-variant RNN encoder-decoder architecture whose weights are learnt in the training phase.

In one embodiment, the processor 206 is configured to transmit the commercial credit score and the merchant delinquency rate associated with the merchant 102 to the acquirer 108 which may take decisions on credit limits or loans for the merchant 102 based on the commercial credit score and the merchant delinquency rate.

In one non-limiting example, assuming, a merchant 'A' requests for increasing a credit limit of a commercial credit card issued by an acquirer bank to $10 k from $3 k. To approve the request, the acquirer bank needs to determine a commercial credit score of the merchant 'A' at the present time. But sometimes, the acquirer bank may have the commercial credit score of the merchant 'A' which was received before three months. Therefore, the available commercial credit score may not be prevalent at the present time for taking the decision. In this scenario, the acquirer bank sends a request to a server system (for example, the server system 200) for determining the commercial credit score of the merchant 'A' at the present time. After receiving the request, the server system accesses payment transaction data of the merchant 'A' for the last two weeks. Along with the payment transaction data, the server system also accesses customer risk profile of customers who purchased from the merchant 'A' in the last two weeks. The customer risk profile (i.e., credit bureau scores) of the customers may be fetched from a database or may be determined by the server system using some credit scoring models.

The server system aggregates merchant transaction attributes (such as, sales volume, sales count, and customer risk profiles of the customers who purchased from the merchant in the last two weeks) with a particular frequency level of aggregation. Since the merchant 'A' is a small merchant entity, the merchant transaction attributes are aggregated on a daily basis. The server system then calculates a merchant membership vector associated with the merchant 'A' indicating merchant's association with already formed soft-clusters and provides the merchant membership vector along with cluster profile variables associated with the merchant 'A' to a trained multi-task learning model. The trained multi-task learning model determines the commercial credit score of the merchant 'A' in the present time. The server system transmits the commercial credit score (e.g., 535) and the merchant delinquency rate (e.g., 2%) of the merchant 'A' to the acquirer bank. Based on the commercial credit score, the acquirer bank approves or declines the request of the merchant 'A'.

Thus, based on the above example, it is clearly understood that the present disclosure enables acquirers to determine commercial credit scores and merchant delinquency rates of their associated merchants in the real time or at any nth future time instants. In other words, the acquirers can access the financial health of their associated merchants with any desired frequency.

Figure 3:
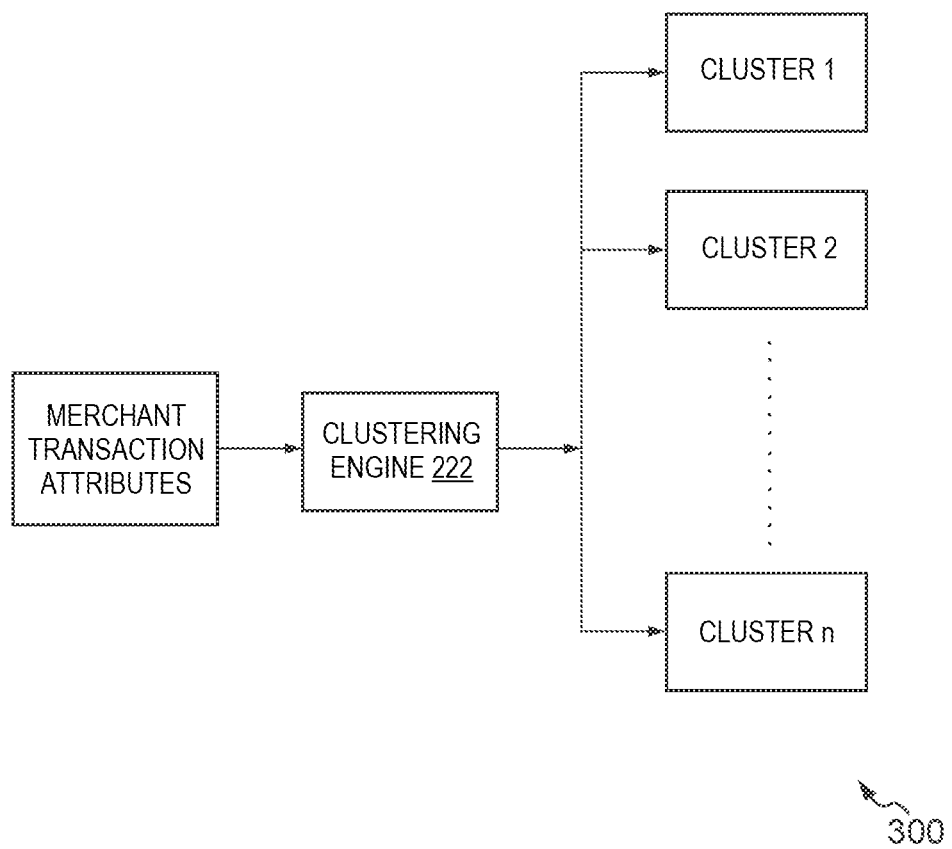
FIG. 3 is a schematic block diagram representation of clustering process, in accordance with an example embodiment of the present disclosure.

FIG. 3 is a schematic block diagram representation 300 of clustering process, in accordance with an example embodiment of the present disclosure. The clustering engine 222 is trained using merchant transaction attributes such as, aggregated sales, count of sales, and customer risk profiles of customers who purchased at the merchant, of each merchant to form soft clusters of merchants. Soft clustering refers to the clustering process in which one or more clusters may overlap with each other. For example, a merchant may belong to two or more clusters at the same time. In some embodiments, in addition to merchant transaction attributes, the clusters may be formed based on customer risk profiles or credit scores of cardholders making payment transactions at merchants' stores. In an example, the number of clusters is decided based on Table 1.

TABLE 1

| Commercial Credit score | Credit Score Percentile | Credit Score Class | Delinquency Rate |
| --- | --- | --- | --- |
| 580-670 | 91-100 | 1 | 1.1% |
| 530-579 | 71-90 | 2 | 2.5% |
| 481-529 | 31-70 | 3 | 5.8% |
| 453-480 | 11-30 | 4 | 9.4% |
| 101-452 | 1-10 | 5 | 53.1% |

As given in the exemplary Table 1, the commercial credit score is divided into 5 categories indicated by the credit score class, therefore, the clustering engine 222 groups a plurality of merchants in five clusters. In another example, the clustering engine 222 may group the merchants into six clusters. In such case, the sixth cluster may accommodate those merchants which might not belong to any of the previous clusters or which are considered to be noisy.

The clustering engine 222 used for soft clustering the merchants may include a Gaussian Mixture Model (GMM) using expectation maximization algorithm. The process used to train the GMM using expectation maximization algorithm is explained below:

Step 1—The clustering engine 222 identifies the number of clusters in which the plurality of merchants needs to be clustered.

Step 2—The clustering engine 222 generates Gaussian model to define each cluster. The probability distribution function is used to quantify the probability of a merchant belonging to a cluster. The probability distribution function $f_X$ for a multi-dimensional vector is given by following equation (1).

$$f_X(x_1, Ix_k) = \frac{\exp\left(-\frac{1}{2}(x-\mu)^T \Sigma^{-1}(x-\mu)\right)}{\sqrt{2\pi^k |\Sigma|}} \qquad \text{Eq (1)}$$

wherein, $x_1$, $I$ $x_k$ are merchant transaction attributes such as count of sales, aggregated sales etc., $\mu$ is mean and $\Sigma$ is covariance.

Step 3—For each merchant, the clustering engine 222 calculates probabilities that it belongs to each cluster. For example, if there are 3 clusters, then probabilities of a merchant belonging to clusters 1, 2, and 3 are calculated. The probabilities are calculated for all the merchants.

Step 4—Using the probabilities calculated in step 3, the clustering engine 222 recalculates the Gaussian models for each cluster.

Steps 3 and 4 are repeated by the clustering engine 222 until the values of probabilities converge on their assignments.

Figure 4:
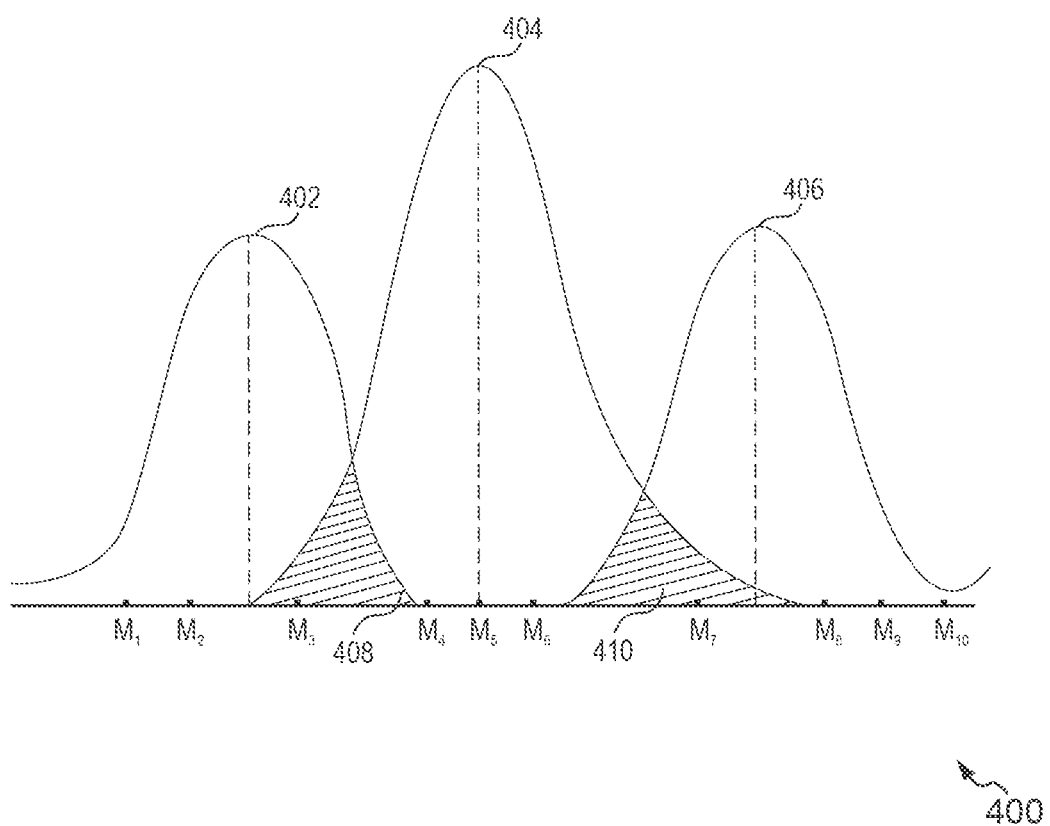
FIG. 4 is an example representation depicting probability distributions of a plurality of clusters generated in the clustering process, in accordance with an example embodiment of the present disclosure.

FIG. 4 is an example representation 400 depicting probability distributions of a plurality of clusters generated in the clustering process, in accordance with an example embodiment of the present disclosure. The probability distribution function (PDF) 402 represents cluster 1, PDF 404 represents cluster 2, and PDF 406 represents cluster 3. Let us consider 10 merchants, namely $M_1$-$M_{10}$, are clustered into 3 groups. As shown in FIG. 4, after applying the Gaussian Mixture Model (GMM), merchants $M_1$ and $M_2$ are clustered into cluster 1. Similarly, merchants $M_4$-$M_6$ and merchants $M_8$-$M_{10}$ are clustered into clusters 2 and 3 respectively. However, $M_3$ is clustered in both cluster 1 and cluster 2. As shown in FIG. 4, the PDFs of cluster 1 and cluster 2 overlap with each other (shown in area 408). Similarly, $M_7$ is clustered in both cluster 2 and cluster 3 and the PDFs of cluster 2 and cluster 3 overlap with each other (shown in area 410). This is soft clustering, wherein a merchant may belong to more than one cluster at the same time.

Once, the clusters are formed, a merchant membership vector is calculated for each merchant. The merchant membership vector may be a probabilistic mixture membership vector. An example of merchant membership vector is as shown below.

| C1 | C2 | C3 | C4 | C5 | C6 |
| --- | --- | --- | --- | --- | --- |

The merchant membership vector has a dimension equal to the number of clusters. Each value in the cell of a merchant membership vector represents the distance of a merchant to the clusters formed. So, as shown in the example above, if 'n' clusters are formed then, the first cell C1 of the merchant membership vector represents the distance of merchant 102 in the cluster diagram from the cluster 1. Similarly, the last cell Cn represents the distance of the merchant 102 from cluster n. Therefore, a merchant membership vector of a merchant represents the distances of the merchant from all the clusters. During the training phase, merchant membership vectors for all the merchants are calculated with respect to the clusters. During the prediction phase, the merchant membership vector of the merchant 102 is calculated for whom the merchant delinquency rate is to be predicted. The merchant membership vector during the prediction phase is calculated using the plurality of clusters formed during the training phase of the clustering engine 222.

Figure 5:
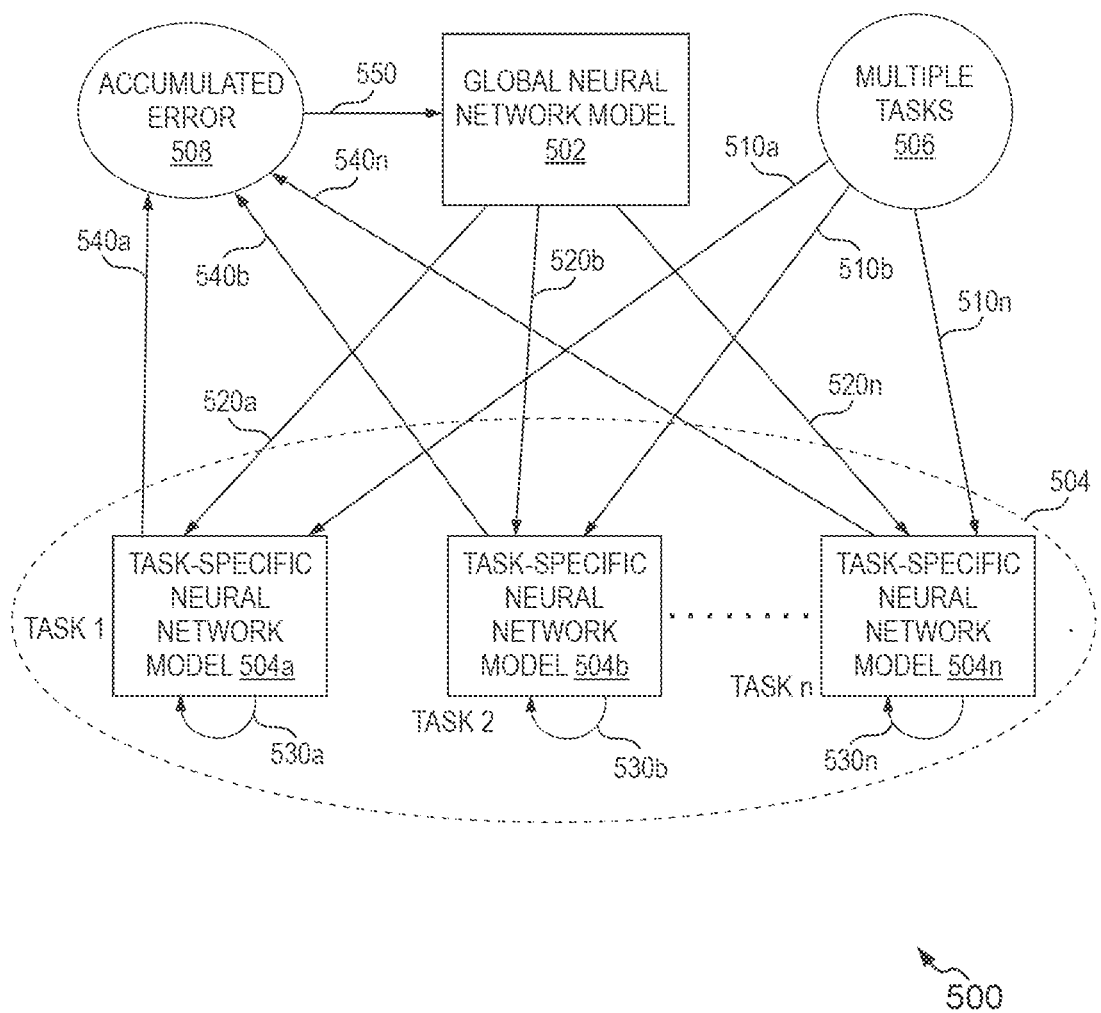
FIG. 5 is a schematic representation of a multi-task learning model, in accordance with an example embodiment of the present disclosure.

FIG. 5 is a schematic representation of a multi-task learning model 500, in accordance with an example embodiment of the present disclosure.

As mentioned above, the multi-task learning model 500 includes neural network models including, but not limited to, a global neural network model 502, a first task-specific neural network model 504a, and a second task-specific neural network model 504b. During the training phase, the multi-task learning model 500 is trained based on merchant membership vectors associated with the plurality of merchants and the cluster profiles associated with the plurality of clusters. The multi-task learning model 500 is configured to learn or derive the merchant risk in the form of calculating delinquency rate and commercial credit score of a merchant simultaneously. The method of multi-task learning is a supervised learning method. The multi-task learning model 500 uses parameters like merchant membership vector and cluster profile variables of the cluster to which the merchant belongs for calculating commercial credit score of merchants falling in that cluster. In one embodiment, the multi-task learning model follows model agnostic machine learning (MAML) model approach.

As shown in the FIG. 5, the multi-task learning model 500 may include task-specific neural network models 504a, 504b, and 504n. The task-specific neural network models are collectively indicated as 504. The plurality of task-specific neural network models 504 are assigned to perform multiple tasks 506 as shown by arrows 510a, 510b, and 510n. The task-specific neural network models 504 are trained to perform multiple tasks 506 simultaneously. For example, one task can be to calculate delinquency rate of a merchant, another task can be to calculate commercial credit score. In one example, one task can also be to predict risky profiles of customers visiting a merchant. Each neural network model has its own weights and model parameters. The global neural network model 502 is associated with global weights and the task-specific neural network models 504 are associated with respective local weights. The global and task-specific neural network models have similar weight architecture except that each task-specific neural network model may also includes a dense layer at the output that is used to generate the commercial credit score, or the merchant delinquency rate.

As the multi-task learning model 500 continues learning of the merchant representations and associated known commercial credit scores and delinquency rates, the global and local weights keep on updating.

During the training phase, the processor 206 is configured to provide merchant membership vectors and their associated cluster profile variables in vector representations to the global neural network model 502. Initially, the processor 206 is configured assign values of the global weights randomly. For each merchant membership vector and associated cluster profile variables, the global neural network model 502 is configured to generate a latent space representation and provide it to the task-specific neural network models 504. In other words, the global weights are copied to the local weights corresponding to the task-specific neural network models 504 for multiple tasks 506 as shown by arrows 520a, 520b, 520n. Each task-specific neural network model (e.g., 504a) has a loss function, a distribution over initial observations, and a transition distribution. The loss function provides a task-specific feedback to the task-specific neural network model for fine-tuning. In one example, each task-specific neural network model is configured to compare the output with known sampled values related to the task (such as, commercial credit score, merchant delinquency rate) and fine-tune the local weights of the task-specific neural network model (see, arrows 530a, 530b, and 530n). In particular, for each task-specific neural network model, model weights are fine-tuned with respect to the defined tasks for a particular number of iterations to derive updated weights. In one example, the fine-tuning is performed based on gradient descent based learning methods.

To perform optimization at the global neural network model 502, the task-specific neural network models 504 with updated local weights are configured to estimate validation errors using a loss function (such as, mean squared error, cross-entropy, etc.) based on validation dataset. The validation errors are accumulated or combined as shown by arrows 540a, 540b, and 540n. The accumulated error 508 is used to update the global weights as shown by arrow 550. Once the global weights are updated, the global weights are copied to the individual task-specific weights and are again fine-tuned as described above. This process of updating global weights and fine tuning local weights continues during the training of the multi-task learning model 500.

Thus, the global neural network model 502 might learn internal features that are broadly applicable to all tasks, rather than a single individual task. The global neural network model 502 is fine-tuned using a gradient-based learning rule for each task, without overfitting. The model parameters of the global neural network model 502 are sensitive to changes in each task, such that small changes in the model parameters will produce large improvements on the loss function of any tasks drawn from the task-specific neural network models 504.

Once the multi-task learning engine 226 is trained, task-specific neural network models are used to predict the health of merchant. For example, a first task-specific neural network model 504a may be used to predict commercial credit score of a merchant. Similarly, the second task-specific neural network model 504a may be used to predict merchant delinquency rate of a merchant. Additionally, a merchant geocoding flag may be embedded to reflect the geographical behavior. For example, a bank in Canada lending to merchants located in Canada may be required to know the health of merchants in Canada only.

Figure 6:
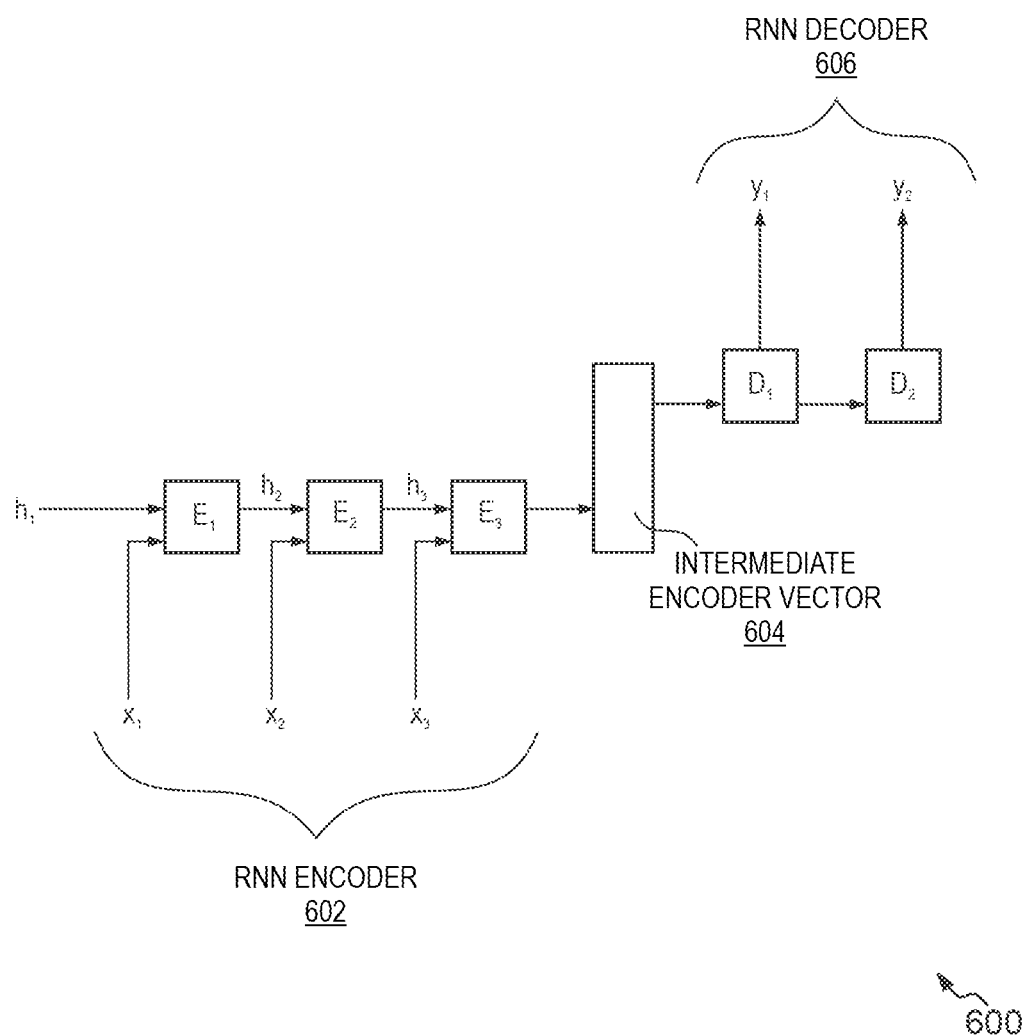
FIG. 6 is an example representation of neural network models included in a multi-task learning model, in accordance with an example embodiment of the present disclosure.

FIG. 6 is an example representation of neural network models included in a multi-task learning model, in accordance with an example embodiment of the present disclosure. To predict merchant level health, an example of neural network models included in a multi-task learning model may be a time variant neural network, such as the Recurrent Neural Network (RNN) with encoder-decoder architecture 600 as shown in FIG. 6. In other words, the global and task-specific neural network models have RNN encoder-decoder architecture. The global and task-specific neural network models have the similar weight architecture except that the task-specific neural network models may have dense layers followed with respective decoders to output score like commercial credit score, merchant delinquency rate.

The architecture 600 includes three major parts—an RNN encoder 602, an intermediate encoder vector 604, and an RNN decoder 606. The RNN encoder 602 includes a stack of multiple recurrent units $E_1$, $E_2$, and $E_3$. The recurrent unit may be Long Short Term Memory (LSTM) cells or Gated Recurrent Unit (GRU) cells. Each recurrent unit accepts a single element ($x_1$, $x_2$, and $x_3$) of input sequence. The recurrent unit collects information for that element and propagates the information forward. Each recurrent unit also takes a hidden state (e.g., $h_1$, $h_2$, and $h_3$) from the previous recurrent unit. The hidden states are computed using following Equation (2).

$$h_t = f(W^{(hh)} h_{t-1} + W^{(hx)} x_t) \quad \text{Eq (2)}$$

wherein, $W^{(hh)}$ and $W^{(hx)}$ are weights used in each recurrent unit of the encoder 602.

Equation 2 represents the result of an ordinary recurrent neural network. Appropriate weights are applied to the previous hidden state $h_{t-1}$ and the input vector $x_t$.

The intermediate encoder vector 604 is the final hidden state produced from the encoder part of the model. Equation 2 is used to calculate the intermediate encoder vector 604. The intermediate encoder vector 604 encapsulates information for all input elements in order to help the decoder make accurate predictions. The intermediate encoder vector 604 acts as the initial hidden state of the decoder part of the model.

The RNN decoder 606 includes a stack of multiple recurrent units $D_1$, $D_2$. Each recurrent unit predicts an output $y_t$ at a time step t. Each recurrent unit accepts a hidden state from the previous unit as input and produces its own hidden state along with the output. The hidden state in decoder 606 is computed using following Equation 3.

$$h_t = f(W^{(hh)} h_{t-1}) \quad \text{Eq (3)}$$

wherein, $W^{(hh)}$ is weight used in each recurrent unit of the decoder 606.

The output $y_t$ at time step t is calculated using following Equation 4.

$$y_t = f(W^{(s)} h_t) \quad \text{Eq (4)}$$

wherein, $W^{(s)}$ is weight used in each recurrent unit of the RNN decoder 606.

The weights of the RNN based global and task-specific neural network models are learnt in a similar fashion as described with reference to the FIG. 5.

For training the multi-task learning model with RNN encoder-decoder architecture 600, the processor 206 is configured to capture datasets with a particular time interval in which a merchant 102 transits from a low delinquency rate (at time T1) to a high delinquency rate (at time T2). Thus, the processor 206 is configured to capture time-variant merchant behavior of a plurality of merchants for training the multi-task learning model. The input features are derived for time duration from a time when the server system 200 receives recent merchant bureau information from external credit bureau databases till a current time. The input features include merchant membership vectors and cluster profile variables for the merchant 102 during the time duration. The RNN encoder of each task-specific neural network model is configured to derive RNN state vectors based on time-dependent input features. The output of the RNN encoder is provided to corresponding to the RNN decoder of each task-specific neural network model, where it is run in a recurrent fashion from the current time till the time T2. The output of the RNN decoder i.e., decoder state vector is combined with a static feature vector (merchant membership vector and cluster profile variables to which the merchant belongs to, for example, median commercial credit score of merchants falling in the cluster) at each time and provided to a dense layer of a task-specific neural network model to output commercial credit score or merchant delinquency rate.

In the prediction phase, the server system 200 is configured to evaluate the current merchant health state and predict merchant health after nth time instant. The processor 206 is configured to use the time variant transition behavior of merchants from a time stamp when merchant health information are available from the external organization database to a current time and feed it to train RNN encoder-decoder based multi-task learning model to predict the merchant health after nth time instant. For predicting the merchant health after nth time instant, the RNN decoders will be run n times. The decoder state vector or representation after the nth time instant is used along with static feature vector derived from cluster is used to predict the merchant health (commercial credit/delinquency rate).

Figure 7:
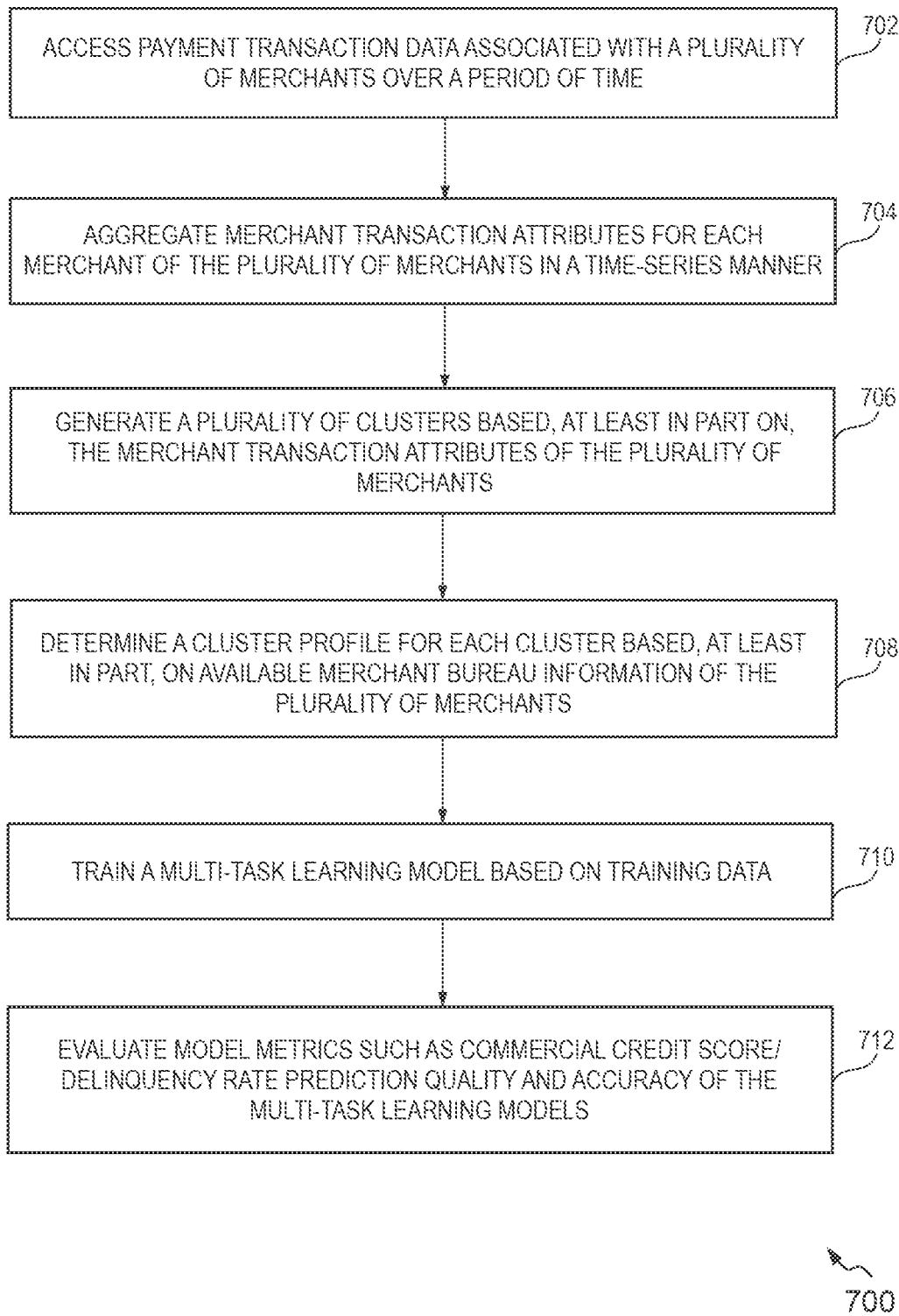
FIG. 7 is a flow chart for training process of machine learning models utilised for predicting merchant level health of a merchant, in accordance with an example embodiment of the present disclosure.

FIG. 7 is a flow chart 700 for training process of machine learning models utilised for predicting merchant level health of a merchant, in accordance with an embodiment of the present disclosure. The sequence of operations of the flow chart 700 may not be necessarily executed in the same order as they are presented. Further, one or more operations may be grouped and performed in form of a single step, or one operation may have several sub-steps that may be performed in parallel or in a sequential manner. The machine learning models are referred to as a soft-clustering model and a multi-task learning model.

At 702, a server system, for e.g., the server system 200 as shown in FIG. 2, accesses payment transaction data (i.e., purchase transaction data) associated with a plurality of merchants over a period of time (e.g., last one year). The server system 200 may fetch the data from a single or multiple acquirer servers corresponding to the plurality of merchants. The server system 200 extracts merchant transaction attributes from the payment transaction data for each merchant (i.e., merchant 102). The merchant transaction attributes include, but are not limited to, time-series sales data associated with the merchant 102, customer risk profiles of the plurality of cardholders 104a-104c who performed payments at the merchant 102 during the period of time, and card product types associated with the plurality of cardholders. In one embodiment, the server system 200 fetches the customer risk profiles of cardholders who performed payment transactions at merchant stores from the external organization database 118 belonging to credit bureau or similar authorities. It is noted that the merchants may have physical stores, or websites.

At 704, the server system 200 aggregates the merchant transaction attributes for each merchant of the plurality of merchants in a time-series manner.

At 706, the server system 200 generates a plurality of clusters based, at least in part on, merchant transaction attributes In particular, the server system 200 applies a mixture model based probabilistic clustering model over the aggregated merchant transaction attributes represented in form of multivariate manner to generate the plurality of clusters. The plurality of clusters is utilized for capturing a merchant transitioning from a low risk profile to a high risk profile.

Subsequent to generating the plurality of clusters, at 708, the server system 200 determines a cluster profile for each cluster based, at least in part, on available merchant bureau information (e.g., commercial credit score) of the plurality of merchants and customer risk profiles (e.g., FICO scores) associated with cardholders performing payments at the plurality of merchants. The merchant bureau information is accessed from the external organization database 118 (for example, D&B database). In particular, cluster profile variables associated with each cluster are determined in terms of a weighted commercial credit score and a weighted default rate. In one example, suppose, n merchants are associated with a cluster C1. The weighted commercial credit score for the cluster C1 is calculated by adding the commercial credit score of each merchant of the n merchants multiplied with a distance of the merchant from a centroid of the cluster C1.

At 710, the server system trains a multi-task learning model based on training data. The training data is the merchant membership vector for each merchant in the cluster, and the cluster profile variables associated with each merchant. The training of multi-task learning model is explained in detail with flowchart with reference to FIG. 8 below. The cluster profile variables associated with the merchant is determined based, at least in part, on distances of the merchant from centroids of the plurality of clusters.

At 712, the server system evaluates model metrics such as commercial credit score and delinquency rate prediction quality and accuracy of the multi-task learning models.

Figure 8:
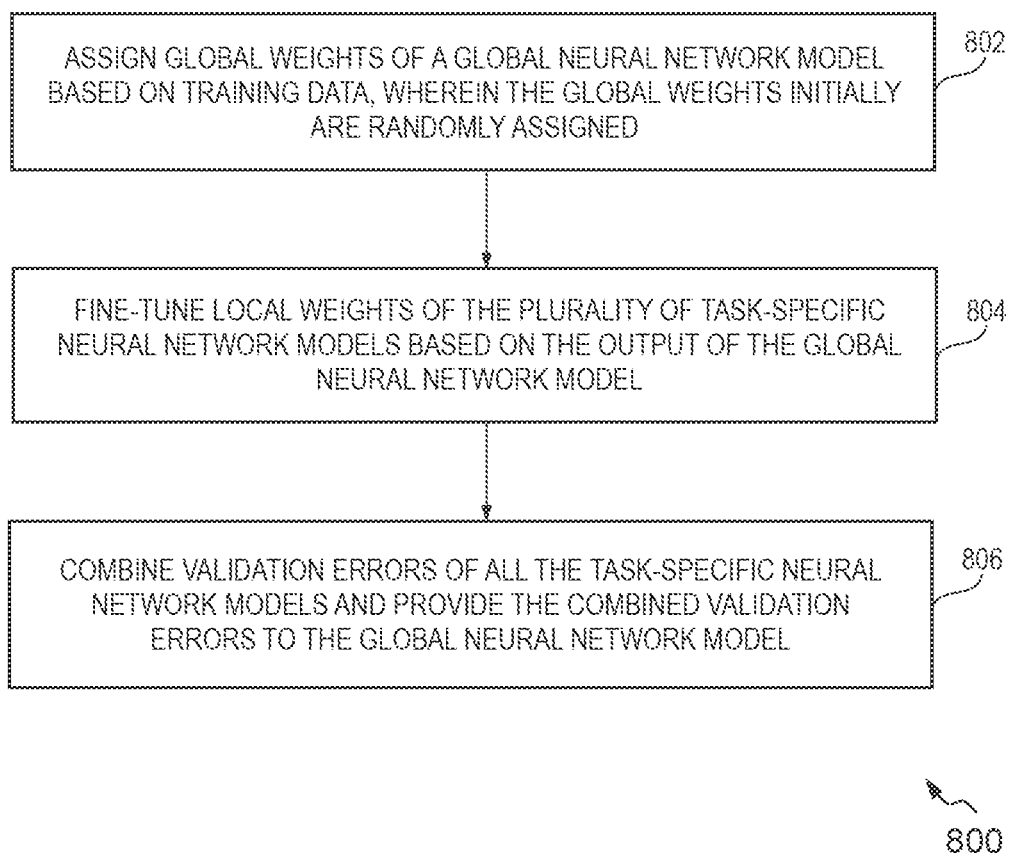
FIG. 8 is a flow chart for training process of a multi-task learning model utilised for predicting merchant level health, in accordance with an example embodiment of the present disclosure.

FIG. 8 is a flow chart for training process of a multi-task learning model by the multi-task learning engine 226 shown in FIG. 2 utilised for predicting merchant level health, in accordance with an example embodiment of the present disclosure. The sequence of operations of the flow chart 800 may not be necessarily executed in the same order as they are presented. Further, one or more operations may be grouped and performed in form of a single step, or one operation may have several sub-steps that may be performed in parallel or in sequential manner.

The multi-task learning engine 226 includes a global weight neural network and a plurality of task specific neural network as explained with reference to FIGS. 5 and 6.

At 802, the multi task machine learning engine assigns global weights of the global neural network based on the training data (i.e. the merchant membership vectors for each merchant in the cluster as well as the cluster profile). The global weights are assigned randomly initially. Further, the local weights of the plurality of task specific neural networks are assigned weights similar to the weights assigned to global weights initially.

Thereafter, at 804, the local weights of the plurality of task specific neural networks are fine-tuned or trained using the output of the global neural network.

At 806, validation errors of all the plurality of task-specific neural networks are combined. Based on the combined validation errors, the global weights are updated. Subsequently, the steps 804 and 806 are repeated until the multi-task learning model is trained.

Figure 9:
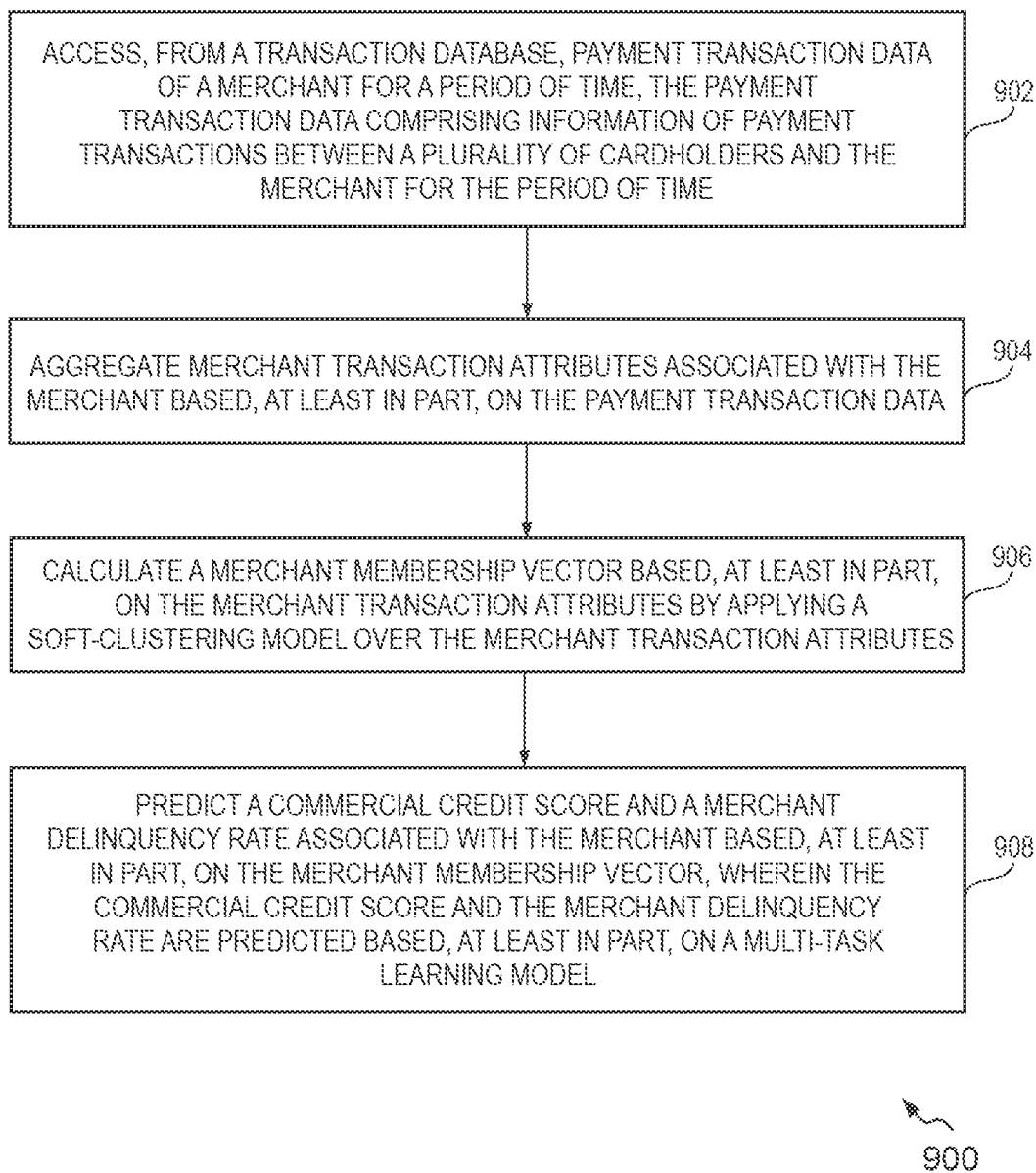
FIG. 9 is a flow diagram of a computer-implemented method for predicting a merchant delinquency rate and commercial credit score of a merchant, in accordance with an example embodiment of the present disclosure.

FIG. 9 is a flow diagram of a computer-implemented method 900 for predicting delinquency rate and commercial credit score of a merchant, in accordance with an example embodiment. The method 900 depicted in the flow diagram may be executed by the server system 110 or the acquirer server 108 as explained with reference to FIG. 1. Operations of the method 900, and combinations of operation in the method 900, may be implemented by, for example, hardware, firmware, a processor, circuitry and/or a different device associated with the execution of software that includes one or more computer program instructions. It is noted that the operations of the method 900 can be described and/or practiced by using a system other than the server systems. The method 900 starts at operation 902.

At operation 902, the method 900 includes accessing, by the server system 110 from a transaction database 114, payment transaction data of a merchant for a period of time. The payment transaction data includes information of payment transactions between a plurality of cardholders and the merchant for the period of time.

At operation 904, the method 900 includes aggregating, by the server system 110, merchant transaction attributes based, at least in part, on the payment transaction data.

At operation 906, the method 900 includes calculating, by the server system 110, a merchant membership vector based, at least in part, on the merchant transaction attributes by applying a soft-clustering model over the merchant transaction attributes.

At operation 908, the method 900 includes predicting, by the server system, a commercial credit score and a merchant delinquency rate associated with the merchant based, at least in part, on the merchant membership vector. The commercial credit score and the merchant delinquency rate are predicted based, at least in part, on a multi-task learning model.

The sequence of operations of the method 900 need not to be necessarily executed in the same order as they are presented. Further, one or more operations may be grouped together and performed in form of a single step, or one operation may have several sub-steps that may be performed in parallel or in sequential manner.

Figure 10:
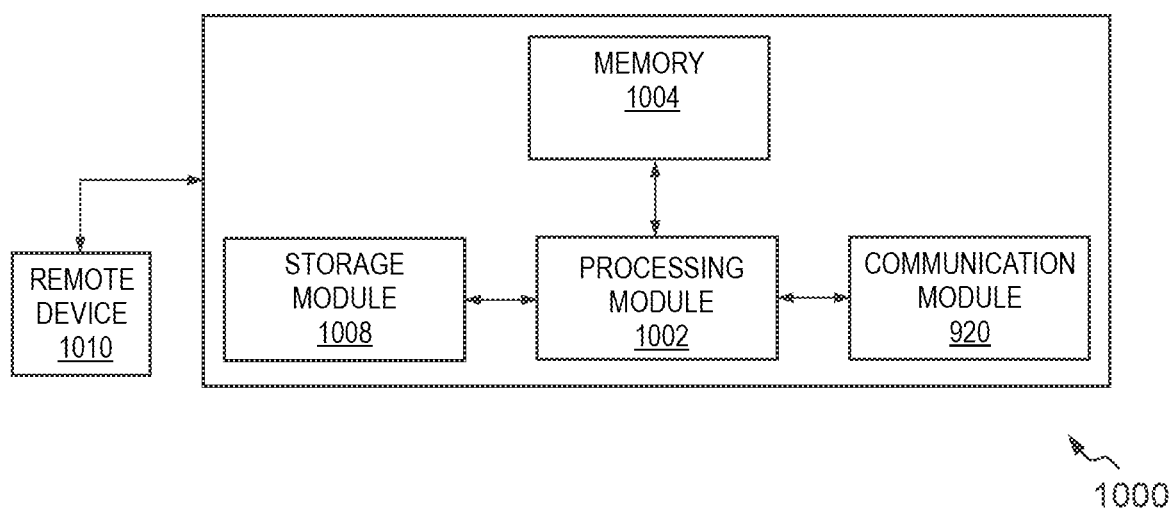
FIG. 10 is a simplified block diagram of an acquirer server, in accordance with an example embodiment of the present disclosure.

FIG. 10 is a simplified block diagram of an acquirer server 1000 of the merchant 102, in accordance with an embodiment of the present disclosure. The acquirer server 1000 is an example of the acquirer server 108 as shown in FIG. 1. The acquirer server 1000 is associated with an acquirer bank or an acquirer, in which a merchant (e.g., the merchant 102) may have a payment account. The acquirer server 1000 includes a processing module 1002 operatively coupled to a memory module 1004, a storage module 1008 and a communication module 1006. The components of the acquirer server 1000 provided herein may not be exhaustive and that the acquirer server 1000 may include more or fewer components than that of depicted in FIG. 10. Further, two or more components may be embodied in one single component, and/or one component may be configured using multiple sub-components to achieve the desired functionalities. Some components of the acquirer server 1000 may be configured using hardware elements, software elements, firmware elements and/or combination thereof.

The storage module 1008 is configured to store machine executable instructions to be accessed by the processing module 1002. Additionally, the storage module 1008 stores information related to, contact information of the user, bank account number, availability of funds in the account, payment card details, payment transaction information and/or the like.

The processing module 1002 is configured to communicate with one or more remote devices such as a remote device 1010 using the communication module 1006 over a network, such as the network 116 of FIG. 1. The examples of the remote device 1010 include a user device, a merchant device, and the server system 200 or other computing systems of issuer and the network 116 and the like. The communication module 1006 is capable of facilitating such operative communication with the remote devices and cloud servers using API (Application Program Interface) calls. The processing module 1002 receives, through the communication module 1006, payment card information, a payment transaction amount, customer information, and merchant information in remote device 1010 (i.e. the server system 200).

The processing module 1002 is configured to fetch payment transaction information requested by the server system from the storage module 1008 or an external database (not shown in the figure) accessible to the acquirer server 1000.

The disclosed methods 700, 800, and 900 with reference to FIGS. 7-9, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY© Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations that are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A server system, comprising:
a memory comprising executable instructions; and
a processor communicably coupled to the memory, the processor configured to execute the executable instructions to cause the server system to:
  train a multi-task learning model comprising a global neural network model, a first task-specific neural network model, and a second task-specific neural network model with a model agnostic machine learning (MAML) model approach that includes iteratively training the multi-task learning model through iterations that each comprises:
    training the global neural network model to learn first and second tasks based on merchant membership vectors that are associated with a plurality of merchants, and cluster profiles of a plurality of clusters, after the training of the global neural network model, copying global weights of the global neural network model to first local weights of the first task-specific neural network model and second local weights of the second task-specific neural network model, after the copying, training the first task-specific neural network model to perform the first task through an adjustment of the first local weights based on a first loss function associated with the first task, wherein the first task includes predicting a commercial credit score, simultaneously with the training of the first task-specific neural network model to perform the first task, training the second task-specific neural network model to perform the second task through an adjustment of the second local weights based on a second loss function associated with the second task, wherein the second task includes predicting a merchant delinquency rate, and training the global neural network model to learn features associated with the first and second tasks by adjusting the global weights based on outputs of the first and second task-specific neural network models;

access, from a transaction database, payment transaction data of a particular merchant for a period of time, the payment transaction data comprising information of payment transactions between a plurality of cardholders and the particular merchant for the period of time;

aggregate merchant transaction attributes associated with the particular merchant based, at least in part, on the payment transaction data;

calculate a calculated merchant membership vector based, at least in part, on the merchant transaction attributes by applying a soft-clustering model over the merchant transaction attributes, wherein the calculated merchant membership vector is indicative of probabilities that the particular merchant is associated with each cluster of the plurality of clusters, and wherein a dimension of the calculated merchant membership vector is equal to a number of the plurality of clusters;

generate, with the global neural network model, a latent space representation based on the calculated merchant membership vector and the cluster profiles;

predict, with the first task-specific neural network model, a commercial credit score associated with the particular merchant based at least in part on the latent space representation; and predict a merchant delinquency rate, with the second task-specific neural network model, associated with the particular merchant based at least in part on the latent space representation.

2. The server system as claimed in claim 1, wherein the merchant transaction attributes comprise time-series sales data associated with the particular merchant, customer risk profiles of the plurality of cardholders who performed payments at the particular merchant during the period of time, and card product types associated with the plurality of cardholders.

3. The server system as claimed in claim 1, wherein the server system is further caused to generate the plurality of clusters by:

accessing historical payment transaction data associated with the plurality of merchants from the transaction database of a particular time duration;

aggregating merchant transaction attributes of each merchant of the plurality of merchants on a timely basis to generate a multivariate time-sequence merchant data for each merchant based at least on the historical payment transaction data; and creating the plurality of clusters based, at least in part, on the multivariate time-sequence merchant data by applying the soft-clustering model.

4. The server system as claimed in claim 3, wherein the server system is further caused to:

determine the cluster profiles for the plurality of clusters based, at least in part, on available merchant bureau information of the plurality of merchants and customer risk profiles associated with cardholders performing payments at the plurality of merchants.

5. The server system as claimed in claim 4, wherein the multi-task learning model is trained based on the merchant membership vectors associated with the plurality of merchants and the cluster profiles of the plurality of clusters.

6. The server system as claimed in claim 5, wherein, to predict the commercial credit score and the merchant delinquency rate of the particular merchant, the server system is further caused to:

provide cluster profile variables associated with the particular merchant to the global neural network model to generate an output, wherein the output is the latent space representation.

7. The server system as claimed in claim 6, wherein the cluster profile variables associated with the particular merchant are determined based, at least in part, on distances of the particular merchant from centroids of the plurality of clusters and the cluster profiles of the plurality of clusters.

8. The server system as claimed in claim 1, wherein the merchant transaction attributes of the particular merchant are aggregated on a timely basis based on a tunable parameter, and wherein the tunable parameter indicates a frequency level of the aggregation of the merchant transaction attributes.

9. A computer-implemented method, comprising:

training a multi-task learning model comprising a global neural network model, a first task-specific neural network model, and a second task-specific neural network model with a model agnostic machine learning (MAML) model approach that includes iteratively training the multi-task learning model through iterations that each comprises:

training the global neural network model to learn first and second tasks based on merchant membership vectors that are associated with a plurality of merchants, and cluster profiles of a plurality of clusters, after the training of the global neural network model, copying global weights of the global neural network model to first local weights of the first task-specific neural network model and second local weights of the second task-specific neural network model, after the copying, training the first task-specific neural network model to perform the first task through an adjustment of the first local weights based on a first loss function associated with the first task, wherein the first task includes predicting a commercial credit score, simultaneously with the training of the first task-specific neural network model to perform the first task, training the second task-specific neural network model to perform the second task through an adjustment of the second local weights based on a second loss function associated with the second task, wherein the second task includes predicting a merchant delinquency rate, and training the global neural network model to learn features associated with the first and second tasks by adjusting the global weights based on outputs of the first and second task-specific neural network models;

accessing, by a server system from a transaction database, payment transaction data of a particular merchant for a period of time, wherein the payment transaction data comprises information of payment transactions between a plurality of cardholders and the particular merchant for the period of time;

aggregating, by the server system, merchant transaction attributes based, at least in part, on the payment transaction data;

calculating, by the server system, a calculated merchant membership vector based, at least in part, on the merchant transaction attributes by applying a soft-clustering model over the merchant transaction attributes, wherein the calculated merchant membership vector is indicative of probabilities that the particular merchant is associated with each cluster of the plurality of clusters, and wherein a dimension of the calculated merchant membership vector is equal to a number of the plurality of clusters;

generate, with the global neural network model, a latent space representation based on the calculated merchant membership vector and the cluster profiles;

predicting, with the first task-specific neural network model and by the server system, a commercial credit score associated with the particular merchant based at least in part on the latent space representation; and predicting a merchant delinquency rate, with the second task-specific neural network model and by the server system, associated with the particular merchant based at least in part on the latent space representation.

10. The computer-implemented method in claim 9, wherein the merchant transaction attributes comprise time-series sales data associated with the particular merchant, customer risk profiles of the plurality of cardholders who performed payments at the particular merchant during the period of time, and card product types associated with the plurality of cardholders.

11. The computer-implemented method in claim 9, wherein the plurality of clusters are generated by:

accessing historical payment transaction data associated with the plurality of merchants from the transaction database of a particular time duration;

aggregating merchant transaction attributes of each merchant of the plurality of merchants on a timely basis to generate a multivariate time-sequence merchant data for each merchant based at least on the historical payment transaction data; and creating the plurality of clusters based, at least in part, on the multivariate time-sequence merchant data by applying the soft-clustering model.

12. The computer-implemented method in claim 11, further comprising:

determining the cluster profiles for the plurality of clusters based, at least in part, on available merchant bureau information of the plurality of merchants and customer risk profiles associated with cardholders performing payments at the plurality of merchants.

13. The computer-implemented method in claim 12, wherein the multi-task learning model is trained based on the merchant membership vectors associated with the plurality of merchants and the cluster profiles of the plurality of clusters.

14. The computer-implemented method in claim 13, further comprising predicting the commercial credit score and the merchant delinquency rate of the particular merchant by:

providing cluster profile variables associated with the particular merchant to the global neural network model to generate an output, wherein the output is the latent space representation.

15. The computer-implemented method in claim 14, wherein the cluster profile variables associated with the particular merchant are determined based, at least in part, on distances of the particular merchant from centroids of the plurality of clusters and the cluster profiles of the plurality of clusters.

16. The computer-implemented method in claim 9, wherein the merchant transaction attributes of the particular merchant are aggregated on a timely basis based on a tunable parameter, and wherein the tunable parameter indicates a frequency level of the aggregation of the merchant transaction attributes.

17. At least one non-transitory computer readable storage medium comprising a set of instructions, which when executed by a computing system, cause the computing system to:

train a multi-task learning model comprising a global neural network model, a first task-specific neural network model, and a second task-specific neural network model with a model agnostic machine learning (MAML) model approach that includes iteratively training the multi-task learning model through iterations that each comprises:

training the global neural network model to learn first and second tasks based on merchant membership vectors that are associated with a plurality of merchants, and cluster profiles of a plurality of clusters, after the training of the global neural network model, copying global weights of the global neural network model to first local weights of the first task-specific neural network model and second local weights of the second task-specific neural network model, after the copying, training the first task-specific neural network model to perform the first task through an adjustment of the first local weights based on a first loss function associated with the first task, wherein the first task includes predicting a commercial credit score, simultaneously with the training of the first task-specific neural network model to perform the first task, training the second task-specific neural network model to perform the second task through an adjustment of the second local weights based on a second loss function associated with the second task, wherein the second task includes predicting a merchant delinquency rate, and training the global neural network model to learn features associated with the first and second tasks by adjusting the global weights based on outputs of the first and second task-specific neural network models;

access, from a transaction database, payment transaction data of a particular merchant for a period of time, the payment transaction data comprising information of payment transactions between a plurality of cardholders and the particular merchant for the period of time;

aggregate merchant transaction attributes associated with the particular merchant based, at least in part, on the payment transaction data;

calculate a calculated merchant membership vector based, at least in part, on the merchant transaction attributes by applying a soft-clustering model over the merchant transaction attributes, wherein the calculated merchant membership vector is indicative of probabilities that the particular merchant is associated with each cluster of the plurality of clusters, and wherein a dimension of the calculated merchant membership vector is equal to a number of the plurality of clusters;

generate, with the global neural network model, a latent space representation based on the calculated merchant membership vector and the cluster profiles;

predict, with the first task-specific neural network model, a commercial credit score associated with the particular merchant based at least in part on the latent space representation; and predict a merchant delinquency rate, with the second task-specific neural network model, associated with the particular merchant based at least in part on the latent space representation.

18. The at least one non-transitory computer readable storage medium of 17, wherein the set of instructions, when executed by the computing system, cause the computing system to:
periodically retrieve the payment transaction data from the transaction database according to a frequency that is set based on a tunable parameter;
periodically aggregate the merchant transaction attributes from the payment transaction data in real-time according to a frequency that is set based on the tunable parameter;
increase the frequency if the merchant has a number of transactions greater than a first amount, and reduce the frequency if the merchant has a number of transactions less than a second amount;
categorize the merchant into a category;
adjust the tunable parameter based on the category to adjust the frequency; and
determine whether to authorize a credit limit or a loan for the merchant based on the merchant delinquency rate and the commercial credit score.

19. The server system of 1, wherein the server system is further caused to:
periodically retrieve the payment transaction data from the transaction database according to a frequency that is set based on a tunable parameter;
periodically aggregate the merchant transaction attributes from the payment transaction data in real-time according to a frequency that is set based on the tunable parameter;
increase the frequency if the merchant has a number of transactions greater than a first amount, and reduce the frequency if the merchant has a number of transactions less than a second amount;
categorize the merchant into a category;
adjust the tunable parameter based on the category to adjust the frequency; and
determine whether to authorize a credit limit or a loan for the merchant based on the merchant delinquency rate and the commercial credit score.

20. The computer-implemented method of 9, further comprising:
periodically retrieving the payment transaction data from the transaction database according to a frequency that is set based on a tunable parameter;
periodically aggregating the merchant transaction attributes from the payment transaction data in real-time according to a frequency that is set based on the tunable parameter;
increasing the frequency if the merchant has a number of transactions greater than a first amount, and reducing the frequency if the merchant has a number of transactions less than a second amount;
categorizing the merchant into a category;
adjusting the tunable parameter based on the category to adjust the frequency; and
determining whether to authorize a credit limit or a loan for the merchant based on the merchant delinquency rate and the commercial credit score.

* * * * *